US 9,383,005 B2

(12) United States Patent
Gunderson

(10) Patent No.: US 9,383,005 B2
(45) Date of Patent: Jul. 5, 2016

(54) HYDRAULIC CONTROL FOR ENGINE START STOP TRANSMISSION SYSTEM

(71) Applicant: GM Global Technology Operations LLC, Detroit, MI (US)

(72) Inventor: Joel H. Gunderson, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 411 days.

(21) Appl. No.: 14/026,266

(22) Filed: Sep. 13, 2013

(65) Prior Publication Data

US 2015/0075314 A1    Mar. 19, 2015

(51) Int. Cl.
  *F16H 61/02*   (2006.01)
  *F16H 61/686*   (2006.01)

(52) U.S. Cl.
  CPC ........ *F16H 61/0267* (2013.01); *F16H 61/0251* (2013.01); *F16H 61/686* (2013.01); *F16H 2061/0253* (2013.01); *Y10T 74/20024* (2015.01)

(58) Field of Classification Search
  CPC .................................................. F16H 61/0267
  See application file for complete search history.

(56) References Cited

U.S. PATENT DOCUMENTS

| | | |
|---|---|---|
| 5,492,509 A | 2/1996 | Goates |
| 6,155,949 A | 12/2000 | Long et al. |
| 6,637,282 B2 | 10/2003 | Harries |
| 7,373,234 B1 | 5/2008 | Hwang et al. |
| 7,949,450 B2 | 5/2011 | Bai |
| 8,069,661 B2 | 12/2011 | Hendrickson et al. |
| 2008/0066463 A1 | 3/2008 | Davison et al. |
| 2008/0216908 A1 | 9/2008 | Vernacchia et al. |
| 2008/0220939 A1 | 9/2008 | Vernacchia et al. |
| 2009/0036265 A1 | 2/2009 | Hwang et al. |
| 2009/0301588 A1 | 12/2009 | Shimizu et al. |
| 2010/0028168 A1 | 2/2010 | Shimizu et al. |
| 2010/0163360 A1 | 7/2010 | Fujii et al. |
| 2010/0181159 A1* | 7/2010 | Shimizu ............... F16H 61/0031 192/85.63 |
| 2011/0118080 A1 | 5/2011 | Sowards et al. |
| 2011/0142690 A1* | 6/2011 | Shimizu ................ F04B 49/007 417/286 |

FOREIGN PATENT DOCUMENTS

JP   2007126974 A   5/2007

* cited by examiner

*Primary Examiner* — Richard Lorence

(57) ABSTRACT

A hydraulic control system for a clutch of a transmission having a plurality of torque transmitting mechanisms and includes a source of pressurized hydraulic fluid, a clutch pressure regulating valve, a clutch pump valve, a first and a second fluid flow check valve, a pressure valve, a first torque transmitting mechanism actuation device, and a pressure control solenoid.

44 Claims, 5 Drawing Sheets

HYDRAULIC CONTROL FOR ENGINE START STOP TRANSMISSION SYSTEM

FIELD

The present disclosure relates to a hydraulic fluid control system for a transmission for an engine start stop application, and more particularly to a transmission hydraulic control system using alternative means of clutch actuation fluid pressure when the engine is off.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios. In the case of powertrains using a combination of the internal combustion (IC) engine and electric propulsion or powertrains using an Engine Start Stop (ESS) powertrain control method, these transmissions have a separate auxiliary electric pump or accumulators for providing the pressurized hydraulic fluid when the IC engine is turned off. While conventional hydraulic control systems are effective, there is room in the art for improved hydraulic control circuits that reduce the amount of complex components while improving efficiency and controllability of the system during restart of the IC engine.

SUMMARY

The present invention provides a hydraulic control system for a multi-speed transmission having a plurality of torque transmitting mechanisms. The hydraulic control system includes a source of pressurized hydraulic fluid, a clutch pressure regulating valve, a clutch pump valve, a first and a second fluid flow check valve, a pressure valve, a first torque transmitting mechanism actuation device, and a pressure control solenoid. The clutch pressure regulating valve has an input and output port and a valve spool. The input port is in fluid communication with the source of pressurized hydraulic fluid and the valve spool is actuatable to allow communication between the input and output ports. The clutch pump valve has a first, second, third, and fourth input port, a first and second output port, and a valve spool. The first input port is in fluid communication with the output port of the clutch pressure regulating valve, the second input port is in fluid communication with the first output port, and the third input port is in communication with a sump of the transmission. The first fluid flow check valve is in communication with both the first output port of the clutch pump valve and the second input port of the clutch pump valve thus preventing backpressure from the second input port to the first output port. The second fluid flow check valve is in communication with the third input port of the clutch pump valve and the sump thus preventing backpressure from the third input port to the sump. The pressure valve has a first, a second, and a third port, and wherein the first port is in communication with the source of pressurized hydraulic fluid, the second port is in communication with the fourth input port of the clutch pump valve, the third port is in communication with the sump, and the second port is selectively in communication with one of the first port and the third port. The first torque transmitting mechanism actuation device in communication with the second output port of the clutch pump valve. The pressure control solenoid is arranged to actuate the valve spool of the clutch pressure regulating valve. The valve spool of the clutch pump valve is selectively actuatable by the pressure control solenoid.

In another example of the present invention, the valve spool of the clutch pump valve has a first end and a second end and is disposed in a valve bore having a first and a second end. A biasing member is disposed between the second end of the valve spool and the second end of the valve bore.

In yet another example of the present invention, the valve spool of the clutch pump valve is axially aligned with the valve spool of the clutch pressure regulating valve.

In yet another example of the present invention, the valve spool of the clutch pump valve is selectively in contact with the valve spool of the clutch pressure regulating valve.

In yet another example of the present invention, the clutch pressure regulating valve has a valve bore with a first end and a second end, the pressure control solenoid is proximate the first end of the valve bore of the clutch pressure regulating valve, the first end of the valve bore of the clutch pump valve is proximate the second end of the valve bore of the clutch pressure regulating valve, the second end of the valve bore of the clutch pressure regulating valve has an axial bore, the first end of the valve bore of the clutch pump valve has an axial bore aligned with the axial bore of the second end of the clutch pressure regulating valve, and the first end of the valve spool of the clutch pump valve is biased against the second end of the valve spool of the clutch pressure regulating valve through the axial bores of the clutch pump valve and the clutch pressure regulating valve.

In yet another example of the present invention, the valve spool of the clutch pump valve is urged toward the second end of the valve bore of the clutch pump valve when the fourth input port of the clutch pump valve is pressurized by the source of pressurized hydraulic fluid.

In yet another example of the present invention, the hydraulic control system has a first and a second mode of operation. During the first mode of operation the source of pressurized hydraulic fluid is activated, the input port and the valve bore of the clutch pressure regulating valve is pressurized, the output port of the clutch pressure regulating valve is selectively pressurized by the pressure control solenoid control of the valve spool of the clutch pressure regulating valve, the fourth input port of the clutch pump valve is pressurized by the source of pressurized hydraulic fluid thus urging the valve spool of the clutch pump valve away from contact with the valve spool of the clutch pressure regulating valve and opening the valve bore of the clutch pump valve for communication between the first input port and the second output port of the clutch pump valve.

In yet another example of the present invention, during the second mode of operation, the source of pressurized hydraulic fluid is deactivated, the valve spool of the clutch pump valve is in contact with the valve spool of the clutch pressure regulating valve, the pressure control solenoid cycles the valve spool of the clutch pump valve to alternatively pressurize and depressurize a portion of the valve bore of the clutch pump valve in communication with the first output port and the second input port of the clutch pump valve.

In yet another example of the present invention, the source of pressurized hydraulic fluid is a hydraulic fluid pump driven by the output of an engine.

In yet another example of the present invention, the first output port and the second input port of the clutch pump valve are disposed radially staggered from each other.

In yet another example of the present invention, the pressure valve includes a spool valve and a fourth port in communication with the source of pressurized hydraulic fluid, the spool valve is actuated by the pressurized hydraulic fluid to allow communication between the first port and the second port of the pressure valve, and the spool valve is actuated by a spring to allow communication between the second port and the third port of the pressure valve.

In yet another example of the present invention, the pressure valve is a solenoid actuated valve that selectively allows communication between the second port and one of the first port and the third port of the pressure valve.

In yet another example of the present invention, the clutch pressure regulating valve is a first clutch pressure regulating valve and the hydraulic control system further includes a second clutch pressure regulating valve having a input port in communication with the source of pressurized hydraulic fluid, an output port in communication with the first torque transmitting mechanism actuation device, and the output port of the first clutch pressure regulating valve is in communication with a second torque transmitting mechanism actuation device.

In yet another example of the present invention, the clutch pump valve provides pressurized hydraulic fluid as lubrication fluid to the transmission.

Further features and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
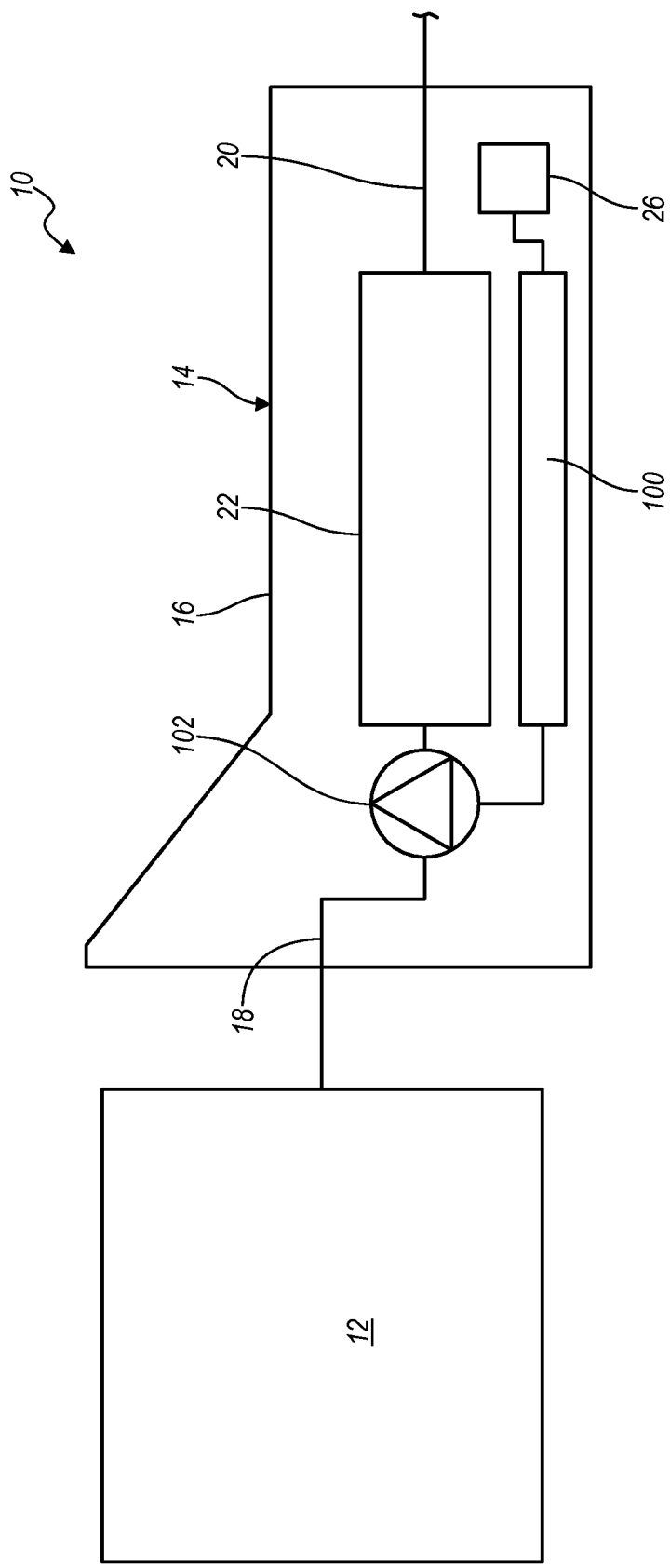
FIG. 1 is a schematic of a powertrain for a vehicle according to the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure. The input shaft 18 is connected with the engine 12 and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

Figure 2:
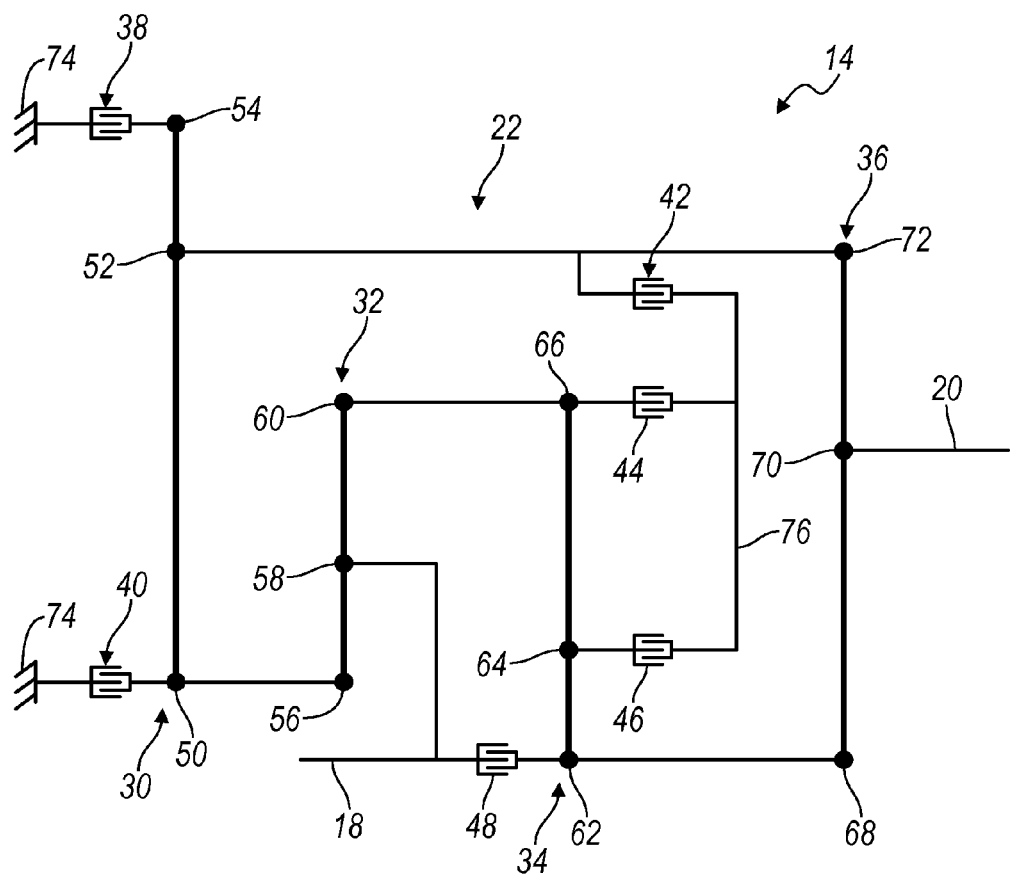
FIG. 2 is a lever diagram depicting a multispeed planetary gear transmission according to the present disclosure.

The gear and clutch arrangement 22 includes a plurality of gear sets, a plurality of shafts, and a plurality of torque transmitting mechanisms, of which an example of is shown in detail in FIG. 2. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. The plurality of torque transmitting mechanisms may include a combination of clutches and brakes as well as other types of selectively actuated torque transmitting devices. It should be appreciated that the specific arrangement and number of the gear sets and the specific arrangement and number of the shafts within the transmission 14 may vary without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the plurality of torque transmitting mechanisms via a hydraulic control system 100 according to the principles of the present disclosure.

The hydraulic control system 100 is operable to selectively engage the plurality of torque transmitting mechanisms by selectively communicating a hydraulic fluid to a shift actuating device that engages a corresponding torque transmitting mechanism, as will be described in greater detail below. The shift actuating device may be a piston assembly or any other hydraulically actuatable mechanism without departing from the scope of the present disclosure. The hydraulic fluid is communicated to the shift actuating device under pressure from a pump 102 that is driven by the engine 12. Accordingly, the pump 102 is operable when the engine 12 is on or running and the pump 102 is inoperable when the engine 12 is off or not running. The pump 102 may be of various types, for example, a gear pump, a vane pump, a gerotor pump, or any other positive displacement pump.

Referring now to FIG. 2, a lever diagram of an exemplary multispeed transmission 14 is illustrated. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In the example shown in FIG. 2, the transmission 14 includes the input shaft 18, a first, second, third, and fourth planetary gear sets 30, 32, 34, 36 a first, second, third, fourth, fifth, and sixth torque transmitting mechanisms 38, 40, 42, 44, 46, 48 and the output shaft 20. The planetary gear sets 30, 32, 34, 36 each include a first, second, and third members. For example, the first planetary gear set 30 includes a first member 50, a second member 52, and a third member 54. The second planetary gear set 32 includes a first member 56, a second member 58, and a third member 60. The third planetary gear set 34 includes a first member 62, a second member 64, and a third member 66. The fourth planetary gear set 36 includes a first member 68, a second member 70, and a third member 72. Some of the members of the planetary gear sets 30, 32, 34, 36 are connected to one another via one of a plurality of interconnecting members. Other members of the planetary gear sets 30, 32, 34, 36 are selectively connected to another member of a planetary gear set 30, 32, 34, 36, the input shaft 18, or a stationary member or transmission housing 74 through at least one of the six torque transmitting mechanisms 38, 40, 42, 44, 46, 48. For example, the first torque transmitting mechanism 38 selectively connects the third member 54 of the first planetary gear set 30 to the transmission housing 42. The second torque transmitting mechanism 40 selectively connects the first member 50 of the first planetary gear set 30 to the transmission housing 74. The third torque transmitting mechanism 42 selectively connects the second member 52 of the first planetary gear set 30 and the third member 72 of the fourth planetary gear set 36 to an intermediate member 76. The fourth torque transmitting mechanism 44 selectively connects the third member 66 of the third planetary gear set 34 and the third member 60 of the second planetary gear set 32 to the intermediate member 76. The fifth torque transmitting mechanism 46 selectively connects the second member 64 of the third planetary gear set 34 to the intermediate member 76. The sixth torque transmitting mechanism 48 selectively connects the first member 62 of the third planetary gear set 34 to the input shaft 18.

The torque transmitting mechanisms 38, 40, 42, 44, 46, 48 are selectively actuated or engaged in combinations of three and four in order to achieve each of a plurality of gear ratios between the input shaft 18 and output shaft 20. For example, a first gear ratio is established between the input shaft 18 and the output shaft 20 when the first, second, and sixth torque transmitting mechanisms 38, 40, 48 are actuated or engaged simultaneously. Additionally, in another example, a one-way clutch (not shown) placed in parallel with the second torque transmitting mechanism 40 allows for engagement of first gear by actuating just the first torque transmitting mechanism 38 and the sixth torque transmitting mechanism 48.

Figure 3:
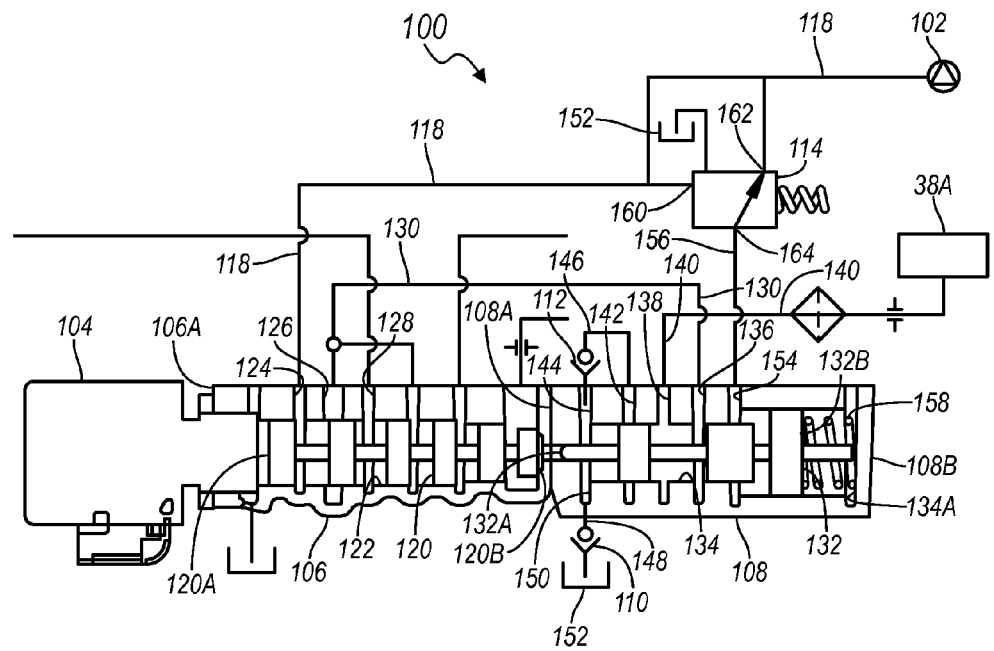
FIG. 3 is a schematic of a hydraulic control circuit in a first mode of operation according the present disclosure.
Figure 4:
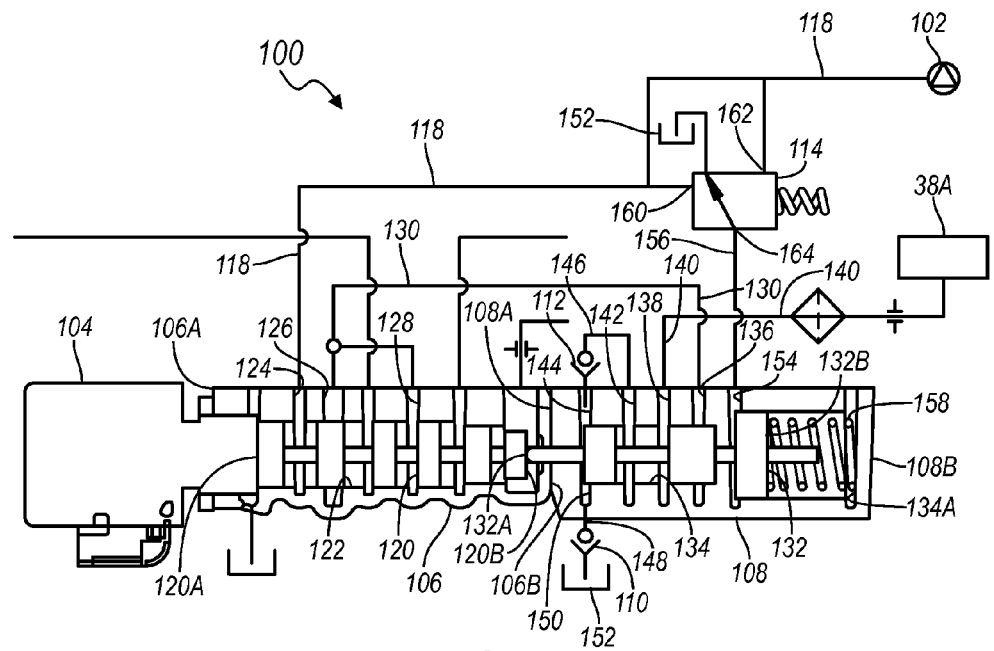
FIG. 4 is a schematic of a hydraulic control circuit in a second mode of operation according the present disclosure.

Referring now to FIGS. 3 and 4, a schematic of an exemplary portion of hydraulic control system 100 is illustrated. In FIG. 3, the hydraulic control system 100 is shown in the state of a first operating mode. FIG. 4 shows the hydraulic system 100 in the state of a second operating mode. The first and second operating modes will be explained in more detail below. Here, the basic structure of the hydraulic control system 100 will now be described. The hydraulic control system 100 includes a pressure control solenoid 104, a clutch pressure regulating valve 106, a clutch pump valve 108, a first and second fluid flow check valves 110, 112, a pressure valve 114, and a plurality of pressurized fluid pathways according to the principles of the present invention that are operable to control a clutch 38 using pressurized hydraulic fluid (not shown). However, the same hydraulic control system 100 may be used for any of the other torque transmitting mechanisms or all of them without departing from the scope of the invention. The hydraulic control system 100 includes a pressurized hydraulic fluid source 102, such as a pump, accumulator, or intermediary hydraulic controls that communicates the pressurized hydraulic fluid to the clutch pressure regulating valve 106 via a first pressurized fluid pathway 118. The clutch pressure regulating valve 106 includes a valve spool 120 disposed in a valve bore 122. The first pressurized fluid pathway 118 communicates the pressurized hydraulic fluid to the valve bore 122 through a first inlet port 124. The clutch pressure regulating valve 106 selectively communicates the pressurized hydraulic fluid from the valve bore 122 to a first and a second outlet port 126, 128. The first and second outlet ports 126, 128 communicate pressurized hydraulic fluid to a second pressurized fluid pathway 130.

The clutch pump valve 108 includes a valve spool 132 disposed in a valve bore 134 and a plurality of inlet and outlet ports. The second pressurized fluid pathway 130 communicates pressurized hydraulic fluid to valve bore 134 through a first inlet port 136 of the clutch pump valve 108. The clutch pump valve 108 selectively communicates the pressurized hydraulic fluid from the valve bore 134 to a first outlet port 138. The first outlet port 138 communicates the pressurized hydraulic fluid to a third pressurized fluid pathway 140. The third pressurized fluid pathway 140 communicates the pressurized hydraulic fluid to an actuating device 38A of the first torque transmitting mechanism 38. In addition to the first inlet port 136, a second inlet port 142 also selectively communicates pressurized hydraulic fluid to the valve bore 134 which in turn selectively communicates pressurized hydraulic fluid to the first outlet port 138. A second outlet port 144 communicates pressurized hydraulic fluid to a fourth pressurized fluid pathway 146 which includes the second fluid flow check valve 112. The fourth pressurized fluid pathway 146 communicates pressurized hydraulic fluid to the second inlet port 142. A fifth pressurized fluid pathway 148 communicates pressurized hydraulic fluid with a third inlet port 150 and includes the first fluid flow check valve 110. The third inlet port 150 selectively communicates the pressurized hydraulic fluid to the valve bore 134. The fifth pressurized fluid pathway 148 pulls hydraulic fluid from a sump 152.

The clutch pump valve 108 further includes a third inlet port 154 that communicates with the valve bore 134 and a sixth pressurized fluid pathway 156. The pressure valve 114 includes a first and second inlet port 160, 162 and a port 164. The sixth pressurized fluid pathway 156 communicates pressurized hydraulic fluid from the port 164 of the pressure valve 114 to the third inlet port 154 of the clutch pump valve 108. The first pressurized fluid pathway 118 also communicates with the pressure valve 114 through a first and a second inlet port 160, 162. The pressure valve 114 communicates pressurized hydraulic fluid from the second inlet port 162 to the port 164 when the first pressurized fluid pathway 118 is pressurized to line pressure by the pump 102. The pressure valve 114 further exhausts the port 164 to the sump 152 when the pump 102 is not pressurizing the first pressurized fluid pathway 118.

In the example shown in FIG. 3, the clutch pump valve 108 and the clutch pressure regulating valve 106 are arranged such that the valve spool 132 of the clutch pump valve 108 is axially aligned with the valve spool 120 of the clutch pressure regulating valve 106. The clutch pressure regulating valve 106 further includes a first and a second end 106A, 106B with the first end 106A adjacent to the pressure control solenoid 104 and the second end 106B opposite the first end. The clutch pump valve 108 also includes a first and a second end 108A, 108B with the first end 108A adjacent to the second end 106B of the clutch pressure regulating valve 106. The valve spool 132 of the clutch pump valve 108 has a first end 132A that extends through the first end 108A of the clutch pump valve 108 and the second end 106B of the clutch pressure regulating valve 106 so that the first end 132A of the valve spool 132 is in contact with a second end 120A of the valve spool 120 of the clutch pressure regulating valve. The clutch pump valve 108 also includes a spring 158 disposed between the second end 132B of the spool valve 132 and an end 134A of the valve bore 134 proximate the second end 108B of the clutch pump valve 108.

In another example of the present invention, the third pressurized fluid pathway 140 communicates the pressurized hydraulic fluid to another hydraulic device (not shown) such as to provide lubrication fluid to the transmission 22. This can be useful when employing the hydraulic control system 100 in a hybrid powertrain system.

Referring now to FIGS. 1, 3, and 4, the two modes of operation of the hydraulic control system 100 will be explained in detail. The first mode of operation of the hydraulic control system 100, shown in FIG. 3, occurs when the engine 12 is running and supplying torque to the pump 102. The pump 102 provides pressurized hydraulic fluid to the first pressurized fluid pathway 118. The first pressurized fluid pathway 118 communicates pressurized hydraulic fluid to the first and second inlet ports 160, 162 of the pressure valve 114 and the first inlet port 124 of the clutch pressure regulating valve 106. The pressurized hydraulic fluid in the first inlet port 160 of the pressure valve 114 urges the pressure valve 114 to communicate the pressurized hydraulic fluid from the second inlet port 162 to the port 164 which also communicates the pressurized hydraulic fluid to the third inlet port 154 of the clutch pump valve 108. The pressurized hydraulic fluid then urges the spool valve 132 to the second end 134A of the valve bore 134 thus compressing the spring 158. The spool valve 132 is now in position such that the second inlet port 142 is separated from communicating with the first outlet port 138 and the first inlet port 136 is in communication with the first outlet port 138. At the same time, the pressure control solenoid 104 urges the spool 120 of clutch pressure regulating valve 106 towards the second end 106B thus allowing communication between the first inlet port 124 of the clutch pressure regulating valve 106 and the first outlet port 124 of the clutch pressure regulating valve 106. This allows pressurized hydraulic fluid in the first pressurized fluid pathway 118 to communicate through the clutch pressure regulating valve 106 to the second pressurized fluid pathway 130 and the clutch pump valve 108. As described above, the first inlet port 136 of the clutch pump valve 108 is in communication with the first outlet port 138 of the clutch pump valve 108. Thus the pressurized hydraulic fluid in the second pressurized fluid pathway 130 communicates through the clutch pump valve 108 to the third pressurized fluid pathway 140. Since the third pressurized fluid pathway communicates with the actuating device 38A of the first torque transmitting mechanism 38 the pressurized hydraulic fluid activates the first torque transmitting mechanism 38. In another example of the invention a hydraulic control system 100 can be utilized to activate each torque transmitting mechanism to allow for actuation regardless of which mode the powertrain 10 is running. Furthermore, a beneficial safety response from such an embodiment is to prevent unintended powerflow from the transmission when a clutch control mechanism fails by releasing the other clutch control mechanisms to achieve a neutral state.

The second mode of operation of the hydraulic control system 100, shown in FIG. 4, occurs when the vehicle is at rest or when the vehicle having an internal combustion engine/electric hybrid powertrain is moving and the engine 12 is not running and therefore the pump 102 is not receiving torque and pressurizing the hydraulic fluid. The pressure control solenoid 104 oscillates between minimum and maximum current at approximately 38 Hz and linearly oscillates the spool 120 of the clutch pressure regulating valve 106 and the spool 132 of the clutch pump valve 108. When the spool 132 of the clutch pump valve 108 moves towards the second end 134 of the bore 134, the first fluid flow check valve 110 opens to intake hydraulic fluid from the sump 152 into the bore 134, and the second fluid flow check valve 112 closes to prevent the hydraulic fluid of the fourth pressurized fluid pathway 146 from entering into the bore 134 through the second outlet port 144. When the spool of the clutch pump valve 108 moves towards the clutch pressure regulating valve 106, the first fluid flow check valve closes to prevent pressurized hydraulic fluid from exhausting to the sump 152 and the second fluid flow check valve 112 opens to allow communication of pressurized hydraulic fluid between the second outlet port 144 and the fourth pressurized fluid pathway 146. The fourth pressurized fluid pathway 146 communicates with the second inlet port 142 to provide pressurized hydraulic fluid to the bore 134 of the clutch pump valve 108 which is further in communication to the first outlet port 138, the third pressurized fluid pathway 140, and the actuating device 38A of the first torque transmitting mechanism 38. As the pressure control solenoid 104 and the spool 132 of the clutch pump valve oscillates, the check valves 110, 112 maintain hydraulic fluid pressure in actuating device 38 when the engine 12 and pump 102 are not operating to provide hydraulic fluid pressure.

Figure 5:
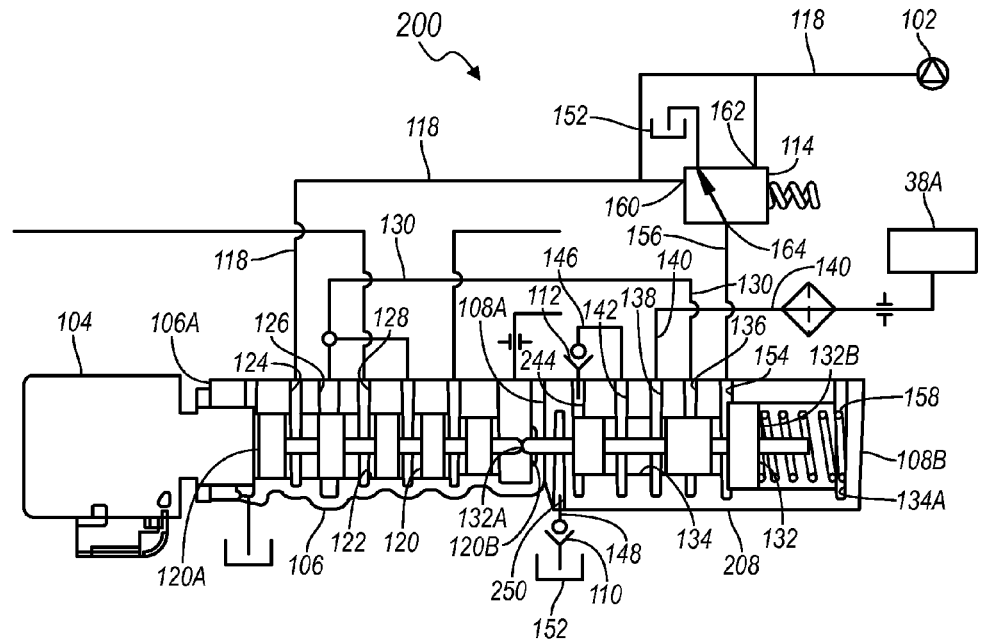
FIG. 5 is a schematic of another example of a hydraulic control circuit according the present disclosure.

Turning now to FIG. 5, another example of a hydraulic control system 200 is illustrated and will now be described. As this example is similar to the previously described example in FIGS. 3 and 4, reference numbers of carried-over components are used again in FIG. 5. The hydraulic control system 200 includes a pressure control solenoid 104, a clutch pressure regulating valve 106, a clutch pump valve 208, a first and second fluid flow check valves 110, 112, a pressure valve 114, and a plurality of pressurized fluid pathways according to the principles of the present invention that are operable to control a clutch 38 using pressurized hydraulic fluid. For example, the hydraulic control system 200 includes a pressurized fluid source 102, such as a pump, accumulator, or intermediary hydraulic controls that communicates the pressurized hydraulic fluid to the clutch pressure regulating valve 106 via a first pressurized fluid pathway 118. The clutch pressure regulating valve 106 includes a valve spool 120 disposed in a valve bore 122. The first pressurized fluid pathway 118 communicates the pressurized hydraulic fluid to the valve bore 122 through a first inlet port 124. The clutch pressure regulating valve 106 selectively communicates the pressurized hydraulic fluid from the valve bore 122 to a first and a second outlet ports 126, 128. The first and second outlet ports 126, 128 communicates pressurized hydraulic fluid to a second pressurized fluid pathway 130.

The clutch pump valve 208 includes a valve spool 132 disposed in a valve bore 134 and a plurality of inlet and outlet ports. The second pressurized fluid pathway 130 communicates pressurized hydraulic fluid to valve bore 134 through a first inlet port 136 of the clutch pump valve 208. The clutch pump valve 208 selectively communicates the pressurized hydraulic fluid from the valve bore 134 to a first outlet port 138. The first outlet port 138 communicates the pressurized hydraulic fluid to a third pressurized fluid pathway 140. The third pressurized fluid pathway 140 communicates the pressurized hydraulic fluid to an actuating device 38A of the first torque transmitting mechanism 38. In addition to the first inlet port 136, a second inlet port 142 also selectively communicates pressurized hydraulic fluid to the valve bore 134 which in turn selectively communicates pressurized hydraulic fluid to the first outlet port 138. A second outlet port 244 communicates pressurized hydraulic fluid to a fourth pressurized fluid pathway 146 which includes the second fluid flow check valve 112. The fourth pressurized fluid pathway 146 communicates pressurized hydraulic fluid to the second inlet port 142. A fifth pressurized fluid pathway 148 communicates pressurized hydraulic fluid with a third inlet port 250 and includes the first fluid flow check valve 110. The third inlet port 250 selectively communicates the pressurized hydraulic fluid to the valve bore 134. The fifth pressurized fluid pathway 148 pulls hydraulic fluid from a sump 152. However, unlike the previous examples of the hydraulic control system 200, the third inlet port 250 and the second outlet port 244 are aligned axially offset or staggered from each other with the third inlet port 250 disposed farther towards the clutch pressure regulating valve 106. This provides a hydraulic lock once the spool 132 separates communication between the second outlet port 244 and the bore 134. The hydraulic lock prevents the spool 134 from colliding with the spool 120 of the clutch pressure regulating valve 106 at the end of the pump return stroke.

The clutch pump valve 208 further includes a third inlet port 154 that communicates with the valve bore 134 and a sixth pressurized fluid pathway 156. The pressure valve 114 includes a first and second inlet port 160, 162 and a port 164. The sixth pressurized fluid pathway 156 communicates pressurized hydraulic fluid from the port 164 of the pressure valve 114 to the third inlet port 154 of the clutch pump valve 208. The first pressurized fluid pathway 118 also communicates with the pressure valve 114 through a first and a second inlet port 160, 162. The pressure valve 114 communicates pressurized hydraulic fluid from the second inlet port 162 to the port 164 when the first pressurized fluid pathway 118 is pressurized to line pressure by the pump 102. The pressure valve 114 further exhausts the port 164 to the sump 152 when the pump 102 is not pressurizing the first pressurized fluid pathway 118. The operation of the hydraulic control system 200 is the same as that of the previous example of the hydraulic control system 100 of FIGS. 3 and 4.

Figure 6:
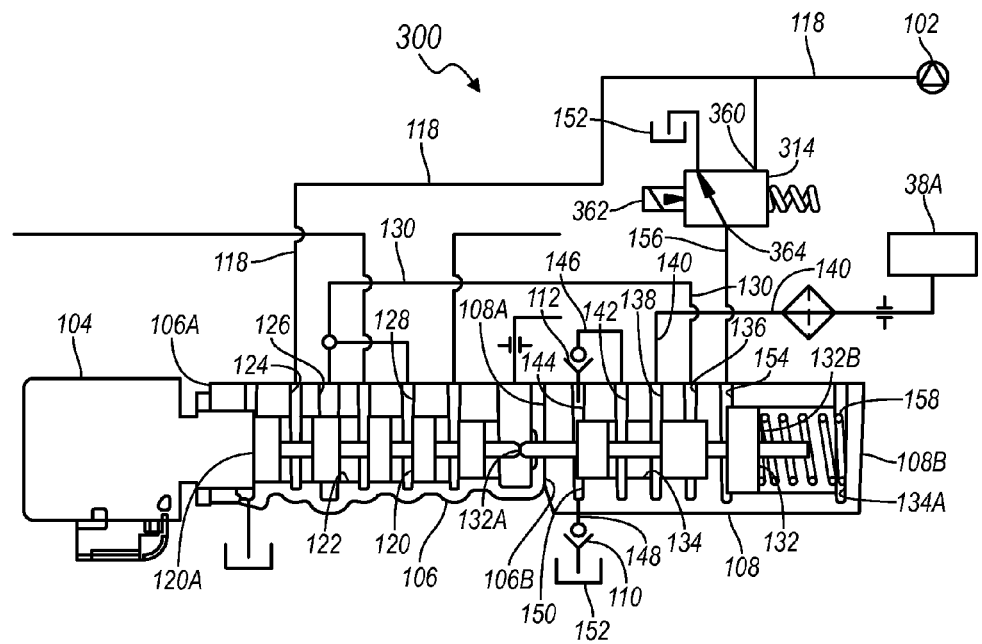
FIG. 6 is a schematic of another example of a hydraulic control circuit according the present disclosure.

Turning now to FIG. 6, another example of a hydraulic control system 300 is illustrated and will now be described. As this example is similar to the previously described example in FIGS. 3 and 4, reference numbers of carried-over components are used again in FIG. 6. The hydraulic control system 300 includes a pressure control solenoid 104, a clutch pressure regulating valve 106, a clutch pump valve 108, a first and second fluid flow check valves 110, 112, a pressure valve 214, and a plurality of pressurized fluid pathways according to the principles of the present invention that are operable to control a clutch 38 using pressurized hydraulic fluid. For example, the hydraulic control system 300 includes a pressurized hydraulic fluid source 102, such as a pump, accumulator, or intermediary hydraulic controls that communicates the pressurized hydraulic fluid to the clutch pressure regulating valve 106 via a first pressurized fluid pathway 118. The clutch pressure regulating valve 106 includes a valve spool 120 disposed in a valve bore 122. The first pressurized fluid pathway 118 communicates the pressurized hydraulic fluid to the valve bore 122 through a first inlet port 124. The clutch pressure regulating valve 106 selectively communicates the pressurized hydraulic fluid from the valve bore 122 to a first and a second outlet ports 126, 128. The first and second outlet ports 126, 128 communicates pressurized hydraulic fluid to a second pressurized fluid pathway 130.

The clutch pump valve 108 includes a valve spool 132 disposed in a valve bore 134 and a plurality of inlet and outlet ports. The second pressurized fluid pathway 130 communicates pressurized hydraulic fluid to valve bore 134 through a first inlet port 136 of the clutch pump valve 108. The clutch pump valve 108 selectively communicates the pressurized hydraulic fluid from the valve bore 134 to a first outlet port 138. The first outlet port 138 communicates the pressurized hydraulic fluid to a third pressurized fluid pathway 140. The third pressurized fluid pathway 140 communicates the pressurized hydraulic fluid to an actuating device 38A of the first torque transmitting mechanism 38. In addition to the first inlet port 136, a second inlet port 142 also selectively communicates pressurized hydraulic fluid to the valve bore 134 which in turn selectively communicates pressurized hydraulic fluid to the first outlet port 138. A second outlet port 144 communicates pressurized hydraulic fluid to a fourth pressurized fluid pathway 146 which includes the second fluid flow check valve 112. The fourth pressurized fluid pathway 146 communicates pressurized hydraulic fluid to the second inlet port 142. A fifth pressurized fluid pathway 148 communicates pressurized hydraulic fluid with a third inlet port 150 and includes the first fluid flow check valve 110. The third inlet port 150 selectively communicates the pressurized hydraulic fluid to the valve bore 134. The fifth pressurized fluid pathway 148 pulls hydraulic fluid from a sump 152.

The clutch pump valve 108 further includes a third inlet port 154 that communicates with the valve bore 134 and a sixth pressurized fluid pathway 156. The pressure valve 314 is a solenoid operated valve that includes an inlet port 360 and a port 364. The sixth pressurized fluid pathway 156 communicates pressurized hydraulic fluid from the port 364 of the pressure valve 314 to the third inlet port 154 of the clutch pump valve 108. The first pressurized fluid pathway 118 also communicates with the pressure valve 314 through the inlet port 360. The pressure valve 314 communicates pressurized hydraulic fluid from the inlet port 360 to the port 364 when the solenoid pressure valve 314 is engaged. The pressure valve 314 further exhausts the port 364 to the sump 152 when solenoid pressure valve 314 is not engaged.

In the example shown in FIG. 3, the clutch pump valve 108 and the clutch pressure regulating valve 106 are arranged such that the valve spool 132 of the clutch pump valve 108 is axially aligned with the valve spool 120 of the clutch pressure regulating valve 106. The clutch pressure regulating valve 106 further includes a first and a second end 106A, 106B with the first end 106A adjacent to the pressure control solenoid 104 and the second end 106B opposite the first end. The clutch pump valve 108 also includes a first and a second end 108A, 108B with the first end 108A adjacent to the second end 106B of the clutch pressure regulating valve 106. The valve spool 132 of the clutch pump valve 108 has a first end 132A that extends through the first end 108A of the clutch pump valve 108 and the second end 106B of the clutch pressure regulating valve 106 so that the first end 132A of the valve spool 132 is in contact with a second end 120A of the valve spool 120 of the clutch pressure regulating valve. The clutch pump valve 108 also includes a spring 158 disposed between the second end 132B of the spool valve 132 and an end 134A of the valve bore 134 proximate the second end 108B of the clutch pump valve 108.

The operation of the hydraulic control system 300 is similar to that of the previous examples of the hydraulic control systems 100, 200 of FIGS. 3-5. One significant difference is that the pressure valve 314 in the hydraulic control system 300 of FIG. 6 is not activated by line pressure from the pump 102, however, it is controllable separately from line pressure. This enables the system to be tailored so that the timing between engine start and clutch pump valve 108 disengagement can be overlapped. As a result, more control of the system is possible to improve performance attributes such as noise and driver perception.

Figure 7:
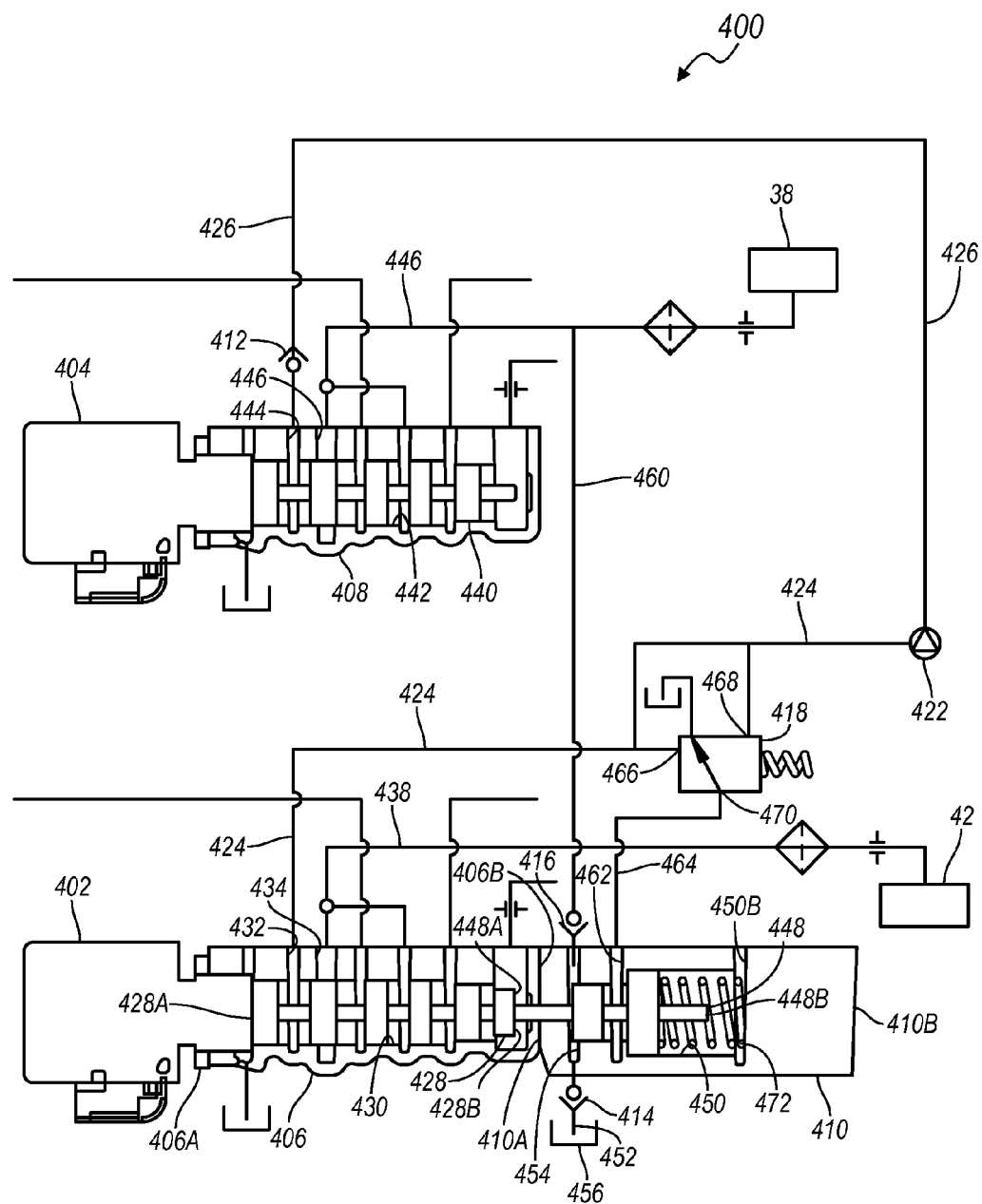
FIG. 7 is a schematic of another example of a hydraulic control circuit according the present disclosure.

Referring now to FIG. 7, another example of a hydraulic control system 400 is illustrated and will now be described. This hydraulic control system 400 utilizes one of the other inactivated clutch pressure regulating valves of the transmission to reduce the size of the clutch pump valve. For example, the hydraulic control system 400 includes a first and a second pressure control solenoid 402, 404, a first and a second clutch pressure regulating valve 406, 408, a clutch pump valve 410, a first, a second, and a third fluid flow check valves 412, 414, 416, a pressure valve 418, and a plurality of pressurized fluid pathways according to the principles of the present invention that are operable to control a clutch 38 using pressurized hydraulic fluid 420. The hydraulic control system 400 further includes a pressurized hydraulic fluid source 422, such as a pump, accumulator, or intermediary hydraulic controls that communicates the pressurized hydraulic fluid 420 to the first clutch pressure regulating valve 406 via a first pressurized fluid pathway 424 and the second clutch pressure regulating valve 408 via a second pressurized fluid pathway 426. The first clutch pressure regulating valve 406 includes a valve spool 428 disposed in a valve bore 430. The first pressurized fluid pathway 424 communicates the pressurized hydraulic fluid 420 to the valve bore 430 through a first inlet port 432. The clutch pressure regulating valve 406 selectively communicates the pressurized hydraulic fluid 420 from the valve bore 430 to a first port 434. The first outlet port 434 communicate pressurized hydraulic fluid 420 to a third pressurized fluid pathway 438. The second clutch pressure regulating valve 408 includes a valve spool 440 disposed in a valve bore 442. The second pressurized fluid pathway 426 communicates the pressurized hydraulic fluid 420 to the valve bore 442 through a first inlet port 444. The clutch pressure regulating valve 408 selectively communicates the pressurized hydraulic fluid 420 from the valve bore 442 to a first outlet port 444. The first outlet port 444 communicates pressurized hydraulic fluid 420 to a fourth pressurized fluid pathway 446. The first check valve 412 is disposed in the second pressurized fluid pathway 426 to prevent pressurized hydraulic fluid 420 from back flowing towards the pump 422 when the pump is not operating.

The clutch pump valve 410 includes a valve spool 448 disposed in a valve bore 450 and a plurality of inlet and outlet ports. A fifth pressurized fluid pathway 452 communicates pressurized hydraulic fluid 420 with a first inlet port 454 and includes the second fluid flow check valve 414. The third inlet port 454 communicates the pressurized hydraulic fluid 420 to the valve bore 450. The fifth pressurized fluid pathway 452 pulls hydraulic fluid 420 from a sump 456. A first outlet port 458 communicates pressurized hydraulic fluid 420 to a sixth pressurized fluid pathway 460 which includes the third fluid flow check valve 416. The sixth pressurized fluid pathway 460 communicates pressurized hydraulic fluid 420 to the fourth pressurized fluid pathway 446.

The clutch pump valve 108 further includes a second inlet port 462 that communicates with the valve bore 450 and a seventh pressurized fluid pathway 464. The pressure valve 418 includes a first and second inlet port 466, 468 and a port 470. The seventh pressurized fluid pathway 464 communicates pressurized hydraulic fluid 420 from the port 470 of the pressure valve 418 to the second inlet port 462 of the clutch pump valve 410. The first pressurized fluid pathway 424 also communicates with the pressure valve 420 through a first and a second inlet port 466, 468. The pressure valve 418 communicates pressurized hydraulic fluid 420 from the second inlet port 468 to the port 470 when the first pressurized fluid pathway 424 is pressurized to line pressure by the pump 422. The pressure valve 418 further exhausts the port 470 to the sump 456 when the pump 422 is not pressurizing the first pressurized fluid pathway 424.

In the example shown in FIG. 7, the clutch pump valve 410 and the first clutch pressure regulating valve 406 are arranged such that the valve spool 448 of the clutch pump valve 410 is axially aligned with the valve spool 428 of the first clutch pressure regulating valve 406. The first clutch pressure regulating valve 406 further includes a first and a second end 406A, 406B with the first end 406A adjacent to the first pressure control solenoid 402 and the second end 406B opposite the first end. The clutch pump valve 410 also includes a first and a second end 410A, 410B with the first end 410A adjacent to the second end 406B of the first clutch pressure regulating valve 406. The valve spool 448 of the clutch pump valve 410 has a first end 448A that extends through the first end 410A of the clutch pump valve 410 and the second end 406B of the first clutch pressure regulating valve 406 so that the first end 448A of the valve spool 448 is in contact with a second end 428A of the valve spool 428 of the first clutch pressure regulating valve. The clutch pump valve 410 also includes a spring 472 disposed between the second end 448B of the spool 448 and an end 450A of the valve bore 450 proximate the second end 410B of the clutch pump valve 410.

With continuing reference to FIGS. 1 and 7, the two modes of operation of the hydraulic control system 400 will be explained in detail. The first mode of operation of the hydraulic control system 400 occurs when the engine 12 is running and supplying torque to the pump 422. The pump 422 provides pressurized hydraulic fluid 420 to the first and second pressurized fluid pathways 424, 426. The first pressurized fluid pathway 424 communicates pressurized hydraulic fluid 420 to the first and second inlet ports 466, 468 of the pressure valve 418, the first inlet port 432 of the first clutch pressure regulating valve 406, and the first inlet port 444 of the second clutch pressure regulating valve 408. The pressurized hydraulic fluid 420 in the first inlet port 466 of the pressure valve 418 urges the pressure valve 114 to communicate the pressurized hydraulic fluid 420 from the second inlet port 468 to the port 470 which also communicates the pressurized hydraulic fluid 420 to the second inlet port 462 of the clutch pump valve 410. The pressurized hydraulic fluid 420 then urges the spool valve 448 to a second end 450B of the valve bore 450 thus compressing the spring 472. The spool 448 is now suspended so that it is not forced by the spring 472 onto the spool 428 of the first clutch pressure regulating valve 406 thus allowing the spool 428 to cycle independently from the spool 448. At the same time, the second pressure control solenoid 404 urges the spool 120 of clutch pressure regulating valve 106 towards the second end 106B thus allowing communication between the first inlet port 124 of the clutch pressure regulating valve 106 and the first outlet port 124 of the clutch pressure regulating valve 106. This allows pressurized hydraulic fluid in the first pressurized fluid pathway 118 to communicate through the clutch pressure regulating valve 106 to the second pressurized fluid pathway 130 and the clutch pump valve 108. As described above, the first inlet port 136 of the clutch pump valve 108 is in communication with the first outlet port 138 of the clutch pump valve 108. Thus the pressurized hydraulic fluid in the second pressurized fluid pathway 130 communicates through the clutch pump valve 108 to the third pressurized fluid pathway 140. Since the third pressurized fluid pathway communicates with the actuating device 38A of the first torque transmitting mechanism 38 the pressurized hydraulic fluid activates the first torque transmitting mechanism 38.

The second mode of operation of the hydraulic control system 100, shown in FIG. 4, occurs when the vehicle is at rest, the engine 12 is not running and therefore the pump 102 is not receiving torque and pressurizing the hydraulic fluid. The pressure control solenoid 104 oscillates between minimum and maximum current at approximately 38Hz and linearly oscillates the spool 120 of the clutch pressure regulating valve 106 and the spool 132 of the clutch pump valve 108. When the spool 132 of the clutch pump valve 108 moves towards the second end 134 of the bore 134, the first fluid flow check valve 110 opens to intake hydraulic fluid from the sump 152 into the bore 134, and the second fluid flow check valve 112 closes to prevent the hydraulic fluid of the fourth pressurized fluid pathway 146 from entering into the bore 134 through the second outlet port 144. When the spool of the clutch pump valve 108 moves towards the clutch pressure regulating valve 106, the first fluid flow check valve closes to prevent pressurized hydraulic fluid from exhausting to the sump 152 and the second fluid flow check valve 112 opens to allow communication of pressurized hydraulic fluid between the second outlet port 144 and the fourth pressurized fluid pathway 146. The fourth pressurized fluid pathway 146 communicates with the second inlet port 142 to provide pressurized hydraulic fluid to the bore 134 of the clutch pump valve 108 which is further in communication to the first outlet port 138, the third pressurized fluid pathway 140, and the actuating device 38A of the first torque transmitting mechanism 38. As the pressure control solenoid 104 and the spool 132 of the clutch pump valve oscillates, the check valves 110, 112 maintain hydraulic fluid pressure in actuating device 38 when the engine 12 and pump 102 are not operating to provide pressurized hydraulic fluid.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A hydraulic control system for a multi-speed transmission having a plurality of torque transmitting mechanisms, the hydraulic control system including:
    a source of pressurized hydraulic fluid;
    a clutch pressure regulating valve having an input and output port and a valve spool, and wherein the input port is in fluid communication with the source of pressurized hydraulic fluid and the valve spool is actuatable to allow communication between the input and output ports;
    a clutch pump valve having a first, second, third, and fourth input port, a first and second output port, and a valve spool, and wherein the first input port is in fluid communication with the output port of the clutch pressure regulating valve, the second input port is in fluid communication with the first output port, and the third input port is in communication with a sump of the transmission;
    a first and a second fluid flow check valves, and wherein the first fluid flow check valve is in communication with both the first output port of the clutch pump valve and the second input port of the clutch pump valve thus preventing backpressure from the second input port to the first output port, and the second fluid flow check valve is in communication with the third input port of the clutch pump valve and the sump thus preventing backpressure from the third input port to the sump;
    a pressure valve having a first, a second, and a third port, and wherein the first port is in communication with the source of pressurized hydraulic fluid, the second port is in communication with the fourth input port of the clutch pump valve, the third port is in communication with the sump, and the second port is selectively in communication with one of the first port and the third port;
    a hydraulic device in communication with one of the first and second output ports of the clutch pump valve; and
    a pressure control solenoid arranged to actuate the valve spool of the clutch pressure regulating valve, and
    wherein the valve spool of the clutch pump valve is selectively actuatable by the pressure control solenoid.

2. The hydraulic control system of claim 1 wherein the valve spool of the clutch pump valve has a first end and a second end and is disposed in a valve bore having a first and a second end, and wherein a biasing member is disposed between the second end of the valve spool and the second end of the valve bore.

3. The hydraulic control system of claim 2 wherein the valve spool of the clutch pump valve is axially aligned with the valve spool of the clutch pressure regulating valve.

4. The hydraulic control system of claim 3 wherein the valve spool of the clutch pump valve is selectively in contact with the valve spool of the clutch pressure regulating valve.

5. The hydraulic control system of claim 4 wherein the clutch pressure regulating valve has a valve bore with a first end and a second end, the pressure control solenoid is proximate the first end of the valve bore of the clutch pressure regulating valve, the first end of the valve bore of the clutch pump valve is proximate the second end of the valve bore of the clutch pressure regulating valve, the second end of the valve bore of the clutch pressure regulating valve has an axial bore, the first end of the valve bore of the clutch pump valve has an axial bore aligned with the axial bore of the second end of the clutch pressure regulating valve, and the first end of the valve spool of the clutch pump valve is biased against the second end of the valve spool of the clutch pressure regulating valve through the axial bores of the clutch pump valve and the clutch pressure regulating valve.

6. The hydraulic control system of claim 5 wherein the valve spool of the clutch pump valve is urged toward the second end of the valve bore of the clutch pump valve when the fourth input port of the clutch pump valve is pressurized by the source of pressurized hydraulic fluid.

7. The hydraulic control system of claim 5 having a first and a second mode of operation, and wherein during the first mode of operation the source of pressurized hydraulic fluid is activated, the input port and the valve bore of the clutch pressure regulating valve is pressurized, the output port of the clutch pressure regulating valve is selectively pressurized by the pressure control solenoid control of the valve spool of the clutch pressure regulating valve, the fourth input port of the clutch pump valve is pressurized by the source of pressurized hydraulic fluid thus urging the valve spool of the clutch pump valve away from contact with the valve spool of the clutch pressure regulating valve and opening the valve bore of the clutch pump valve for communication between the first input port and the second output port of the clutch pump valve.

8. The hydraulic control system of claim 7 wherein during the second mode of operation, the source of pressurized hydraulic fluid is deactivated, the valve spool of the clutch pump valve is in contact with the valve spool of the clutch pressure regulating valve, the pressure control solenoid cycles the valve spool of the clutch pump valve to alternatively pressurize and depressurize a portion of the valve bore of the clutch pump valve in communication with the first output port and the second input port of the clutch pump valve.

9. The hydraulic control system of claim 1 wherein the source of pressurized hydraulic fluid is a hydraulic fluid pump driven by the output of an engine.

10. The hydraulic control system of claim 1 wherein the first output port and the second input port of the clutch pump valve are disposed radially staggered from each other.

11. The hydraulic control system of claim 1 wherein the pressure valve includes a spool valve and a fourth port in communication with the source of pressurized hydraulic fluid, the spool valve is actuated by the pressurized hydraulic fluid to allow communication between the first port and the second port of the pressure valve, and the spool valve is actuated by a spring to allow communication between the second port and the third port of the pressure valve.

12. The hydraulic control system of claim 1 wherein the pressure valve is a solenoid actuated valve that selectively allows communication between the second port and one of the first port and the third port of the pressure valve.

13. The hydraulic control system of claim 1 wherein the clutch pressure regulating valve is a first clutch pressure regulating valve and the hydraulic control system further includes a second clutch pressure regulating valve having a input port in communication with the source of pressurized hydraulic fluid, an output port in communication with the hydraulic device, and the output port of the first clutch pressure regulating valve is in communication with a second torque transmitting mechanism actuation device.

14. The hydraulic control system of claim 1 wherein the hydraulic device is a first torque transmitting mechanism actuation device.

15. The hydraulic control system of claim 1 wherein the hydraulic device is a lubrication distribution device for providing hydraulic fluid as lubrication fluid to the transmission.

16. A hydraulic control system for a multi-speed transmission having a plurality of torque transmitting mechanisms, the hydraulic control system including:
   a source of pressurized hydraulic fluid;
   a clutch pressure regulating valve having an input and output port and a valve spool, and wherein the input port is in fluid communication with the source of pressurized hydraulic fluid and the valve spool is actuatable to allow communication between the input and output ports;
   a clutch pump valve having a first, second, third, and fourth input port, a first and second output port, and a valve spool, and wherein the first input port is in fluid communication with the output port of the clutch pressure regulating valve, the second input port is in fluid communication with the first output port, and the third input port is in communication with a sump of the transmission;
   a first and a second fluid flow check valves, and wherein the first fluid flow check valve is in communication with both the first output port of the clutch pump valve and the second input port of the clutch pump valve thus preventing backpressure from the second input port to the first output port, and the second fluid flow check valve is in communication with the third input port of the clutch pump valve and the sump thus preventing backpressure from the third input port to the sump;
   a pressure valve having a first, a second, and a third port, and wherein the first port is in communication with the source of pressurized hydraulic fluid, the second port is in communication with the fourth input port of the clutch pump valve, the third port is in communication with the sump, and the second port is selectively in communication with one of the first port and the third port;
   a hydraulic device in communication with one of the first and second output ports of the clutch pump valve; and
   a pressure control solenoid arranged to actuate the valve spool of the clutch pressure regulating valve, and
   wherein the valve spool of the clutch pump valve is selectively actuatable by the pressure control solenoid, the hydraulic control system has a first and a second mode of operation, during the first mode of operation the source of pressurized hydraulic fluid is activated and during the second mode of operation, the source of pressurized hydraulic fluid is deactivated.

17. The hydraulic control system of claim 16 wherein the valve spool of the clutch pump valve has a first end and a second end and is disposed in a valve bore having a first and a second end, and wherein a biasing member is disposed between the second end of the valve spool and the second end of the valve bore.

18. The hydraulic control system of claim 17 wherein the valve spool of the clutch pump valve is axially aligned with the valve spool of the clutch pressure regulating valve.

19. The hydraulic control system of claim 18 wherein the valve spool of the clutch pump valve is selectively in contact with the valve spool of the clutch pressure regulating valve.

20. The hydraulic control system of claim 19 wherein the clutch pressure regulating valve has a valve bore with a first end and a second end, the pressure control solenoid is proximate the first end of the valve bore of the clutch pressure regulating valve, the first end of the valve bore of the clutch pump valve is proximate the second end of the valve bore of the clutch pressure regulating valve, the second end of the valve bore of the clutch pressure regulating valve has an axial bore, the first end of the valve bore of the clutch pump valve has an axial bore aligned with the axial bore of the second end of the clutch pressure regulating valve, and the first end of the valve spool of the clutch pump valve is biased against the second end of the valve spool of the clutch pressure regulating valve through the axial bores of the clutch pump valve and the clutch pressure regulating valve.

21. The hydraulic control system of claim 20 wherein the valve spool of the clutch pump valve is urged toward the second end of the valve bore of the clutch pump valve when the fourth input port of the clutch pump valve is pressurized by the source of pressurized hydraulic fluid.

22. The hydraulic control system of claim 21 wherein during the first mode of operation the input port and the valve bore of the clutch pressure regulating valve is pressurized, the output port of the clutch pressure regulating valve is selectively pressurized by the pressure control solenoid control of the valve spool of the clutch pressure regulating valve, the fourth input port of the clutch pump valve is pressurized by the source of pressurized hydraulic fluid thus urging the valve spool of the clutch pump valve away from contact with the valve spool of the clutch pressure regulating valve and opening the valve bore of the clutch pump valve for communication between the first input port and the second output port of the clutch pump valve.

23. The hydraulic control system of claim 22 wherein during the second mode of operation, the valve spool of the clutch pump valve is in contact with the valve spool of the clutch pressure regulating valve, the pressure control solenoid cycles the valve spool of the clutch pump valve to alternatively pressurize and depressurize a portion of the valve bore of the clutch pump valve in communication with the first output port and the second input port of the clutch pump valve.

24. The hydraulic control system of claim 16 wherein the source of pressurized hydraulic fluid is a hydraulic fluid pump driven by the output of an engine.

25. The hydraulic control system of claim 16 wherein the first output port and the second input port of the clutch pump valve are disposed radially staggered from each other.

26. The hydraulic control system of claim 16 wherein the pressure valve includes a spool valve and a fourth port in communication with the source of pressurized hydraulic fluid, the spool valve is actuated by the pressurized hydraulic fluid to allow communication between the first port and the second port of the pressure valve, and the spool valve is actuated by a spring to allow communication between the second port and the third port of the pressure valve.

27. The hydraulic control system of claim 16 wherein the pressure valve is a solenoid actuated valve that selectively allows communication between the second port and one of the first port and the third port of the pressure valve.

28. The hydraulic control system of claim 16 wherein the clutch pressure regulating valve is a first clutch pressure regulating valve and the hydraulic control system further includes a second clutch pressure regulating valve having a input port in communication with the source of pressurized hydraulic fluid, an output port in communication with the hydraulic device, and the output port of the first clutch pressure regulating valve is in communication with a second torque transmitting mechanism actuation device.

29. The hydraulic control system of claim 16 wherein the hydraulic device is a first torque transmitting mechanism actuation device.

30. The hydraulic control system of claim 16 wherein the hydraulic device is a lubrication distribution device for providing hydraulic fluid as lubrication fluid to the transmission.

31. A hydraulic control system for a multi-speed transmission having a plurality of torque transmitting mechanisms, the hydraulic control system including:
a source of pressurized hydraulic fluid;
a clutch pressure regulating valve having an input and output port and a valve spool, and wherein the input port is in fluid communication with the source of pressurized hydraulic fluid and the valve spool is actuatable to allow communication between the input and output ports;
a clutch pump valve having a first, second, third, and fourth input port, a first and second output port, and a valve spool, and wherein the first input port is in fluid communication with the output port of the clutch pressure regulating valve, the second input port is in fluid communication with the first output port, and the third input port is in communication with a sump of the transmission, the valve spool of the clutch pump valve has a first end and a second end and is disposed in a valve bore having a first and a second end, and wherein a biasing member is disposed between the second end of the valve spool and the second end of the valve bore;
a first and a second fluid flow check valves, and wherein the first fluid flow check valve is in communication with both the first output port of the clutch pump valve and the second input port of the clutch pump valve thus preventing backpressure from the second input port to the first output port, and the second fluid flow check valve is in communication with the third input port of the clutch pump valve and the sump thus preventing backpressure from the third input port to the sump;
a pressure valve having a first, a second, and a third port, and wherein the first port is in communication with the source of pressurized hydraulic fluid, the second port is in communication with the fourth input port of the clutch pump valve, the third port is in communication with the sump, and the second port is selectively in communication with one of the first port and the third port;
a hydraulic device in communication with one of the first and second output ports of the clutch pump valve; and
a pressure control solenoid arranged to actuate the valve spool of the clutch pressure regulating valve, and
wherein the valve spool of the clutch pump valve is selectively actuatable by the pressure control solenoid, the hydraulic control system has a first and a second mode of operation, during the first mode of operation the source of pressurized hydraulic fluid is activated and during the second mode of operation, the source of pressurized hydraulic fluid is deactivated.

32. The hydraulic control system of claim 31 wherein the valve spool of the clutch pump valve is axially aligned with the valve spool of the clutch pressure regulating valve.

33. The hydraulic control system of claim 32 wherein the valve spool of the clutch pump valve is selectively in contact with the valve spool of the clutch pressure regulating valve.

34. The hydraulic control system of claim 33 wherein the clutch pressure regulating valve has a valve bore with a first end and a second end, the pressure control solenoid is proximate the first end of the valve bore of the clutch pressure regulating valve, the first end of the valve bore of the clutch pump valve is proximate the second end of the valve bore of the clutch pressure regulating valve, the second end of the valve bore of the clutch pressure regulating valve has an axial bore, the first end of the valve bore of the clutch pump valve has an axial bore aligned with the axial bore of the second end of the clutch pressure regulating valve, and the first end of the valve spool of the clutch pump valve is biased against the second end of the valve spool of the clutch pressure regulating valve through the axial bores of the clutch pump valve and the clutch pressure regulating valve.

35. The hydraulic control system of claim 34 wherein the valve spool of the clutch pump valve is urged toward the second end of the valve bore of the clutch pump valve when the fourth input port of the clutch pump valve is pressurized by the source of pressurized hydraulic fluid.

36. The hydraulic control system of claim 35 wherein during the first mode of operation the input port and the valve bore of the clutch pressure regulating valve is pressurized, the output port of the clutch pressure regulating valve is selectively pressurized by the pressure control solenoid control of the valve spool of the clutch pressure regulating valve, the fourth input port of the clutch pump valve is pressurized by the source of pressurized hydraulic fluid thus urging the valve spool of the clutch pump valve away from contact with the valve spool of the clutch pressure regulating valve and opening the valve bore of the clutch pump valve for communication between the first input port and the second output port of the clutch pump valve.

37. The hydraulic control system of claim 36 wherein during the second mode of operation, the valve spool of the clutch pump valve is in contact with the valve spool of the clutch pressure regulating valve, the pressure control solenoid cycles the valve spool of the clutch pump valve to alternatively pressurize and depressurize a portion of the valve bore of the clutch pump valve in communication with the first output port and the second input port of the clutch pump valve.

38. The hydraulic control system of claim 31 wherein the source of pressurized hydraulic fluid is a hydraulic fluid pump driven by the output of an engine.

39. The hydraulic control system of claim 31 wherein the first output port and the second input port of the clutch pump valve are disposed radially staggered from each other.

40. The hydraulic control system of claim 31 wherein the pressure valve includes a spool valve and a fourth port in communication with the source of pressurized hydraulic fluid, the spool valve is actuated by the pressurized hydraulic fluid to allow communication between the first port and the second port of the pressure valve, and the spool valve is actuated by a spring to allow communication between the second port and the third port of the pressure valve.

41. The hydraulic control system of claim 31 wherein the pressure valve is a solenoid actuated valve that selectively allows communication between the second port and one of the first port and the third port of the pressure valve.

42. The hydraulic control system of claim 31 wherein the clutch pressure regulating valve is a first clutch pressure regulating valve and the hydraulic control system further includes a second clutch pressure regulating valve having a input port in communication with the source of pressurized hydraulic fluid, an output port in communication with the first torque transmitting mechanism actuation device, and the output port of the first clutch pressure regulating valve is in communication with a second torque transmitting mechanism actuation device.

43. The hydraulic control system of claim 31 wherein the hydraulic device is a first torque transmitting mechanism actuation device.

44. The hydraulic control system of claim 31 wherein the hydraulic device is a lubrication distribution device for providing hydraulic fluid as lubrication fluid to the transmission.

* * * * *